(12) United States Patent
Shibuya et al.

(10) Patent No.: US 7,830,584 B2
(45) Date of Patent: Nov. 9, 2010

(54) ORGANIC-INORGANIC COMPOSITE MATERIAL AND METHOD FOR PRODUCING THE SAME, AND FUNCTIONAL ELECTRODE AND FUNCTIONAL DEVICE

(75) Inventors: Takeshi Shibuya, Yokohama (JP); Shigenobu Hirano, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 30 days.

(21) Appl. No.: 12/204,520

(22) Filed: Sep. 4, 2008

(65) Prior Publication Data

US 2009/0002802 A1 Jan. 1, 2009

Related U.S. Application Data

(63) Continuation of application No. PCT/JP2006/32641, filed on Dec. 28, 2006.

(51) Int. Cl.
- G02F 1/153 (2006.01)
- B32B 9/04 (2006.01)
- C09K 9/00 (2006.01)

(52) U.S. Cl. .................. 359/265; 359/272; 359/273; 359/274; 359/275; 428/447; 428/450; 252/583; 252/586

(58) Field of Classification Search ......... 359/265–275; 428/447, 450; 252/583, 586
See application file for complete search history.

(56) References Cited

U.S. PATENT DOCUMENTS 6,426,827 B1   7/2002   Bonhote et al.
6,903,148 B2 *   6/2005   Suzuki et al. ............... 523/216

FOREIGN PATENT DOCUMENTS

| EP | 0 486 469 A1 * | 5/1992 |
|---|---|---|
| JP | 54-123965 | 9/1979 |
| JP | 61-029485 | 2/1986 |
| JP | 2000-506629 | 5/2000 |
| JP | 2007-031708 | 2/2007 |
| JP | 2007-047582 | 2/2007 |
| JP | 2007-047656 | 2/2007 |

OTHER PUBLICATIONS

Brian O'regan, et al. a low cost, high-efficiency solar cell based on dye-sensitized colloidal $TiO_2$ films, Nature—vol. 353, Oct. 24, 1991, pp. 737-740.

* cited by examiner

*Primary Examiner*—Evelyn A. Lester
(74) *Attorney, Agent, or Firm*—Oblon, Spivak, McClelland, Maier & Neustadt, L.L.P.

(57) ABSTRACT

The present invention provides an organic-inorganic composite material containing a metal oxide, and a functional organic material located on the metal oxide, wherein the functional organic material and the metal oxide are bound via a silanol bond. An aspect that the silanol bond is formed by reacting a silane coupling agent with the metal oxide, and an aspect that the silane coupling agent has a reactive terminal are preferred. The present invention also provides a display electrode for electrochromic display device and electrode for photoelectric conversion device using the organic-inorganic composite material, an electrochromic display device using the display electrode and a photoelectric conversion device using the electrode.

16 Claims, 1 Drawing Sheet

ORGANIC-INORGANIC COMPOSITE MATERIAL AND METHOD FOR PRODUCING THE SAME, AND FUNCTIONAL ELECTRODE AND FUNCTIONAL DEVICE

CROSS-REFERENCE TO RELATED APPLICATIONS

This is a continuation of Application No. PCT/JP2006/326241, filed on Dec. 28, 2006.

BACKGROUND OF THE INVENTION

1. Field of the Invention

The present invention relates to an organic-inorganic composite material usable as an electrochromic display device and photoelectric conversion device, and a method for producing the organic-inorganic composite material, and a functional electrode and functional device using the organic-inorganic composite material.

2. Description of the Related Art

Recently, much research effort has been made to electronic paper as an electronic medium that is expected to displace paper. In contrast to conventional displays including CRTs and liquid crystal displays (LCDs), electronic paper is required to have the following characteristics: (1) being a flexible reflective display device; (2) high white reflectance and contrast ratio; (3) high definition display; (4) memory effect in display; (5) low-voltage drive capability; (6) slimness and lightness; (7) inexpensiveness, and the like. For example, an electrochromic display device utilizing color development/color erasure of an electrochromic compound has been researched and developed in wide ranges such as material development, device design and the like as a candidate for electronic paper, because it is a reflective display device, has memory effect and can be driven at low voltage. Various colors can be developed according to material structure, thus it is expected to be used also as a multiple color display device.

As a material for realizing an electronic device such as those typified by electronic paper, an organic-inorganic composite material has been actively researched. For example, Japanese Patent Application Laid-Open (JP-A) No. 2000-506629 proposes a material in which an electrochromic compound is adsorbed on a nanocrystalline layer deposited on an electrode. In JP-A No. 2000-506629, a terminal of a functional organic material such as acidic groups of a carboxylic acid, salicylic acid and the like is adsorbed to hydroxyl groups of inorganic fine particles, thus an organic compound can be adsorbed on the inorganic fine particles, but its bonding force is not so strong that the bonds between the organic compound and the inorganic fine particles are easily broken when an electrochromic device is produced, repeatedly used, or used under alkaline conditions, and the device has poor durability.

On the other hand, a dye-sensitized solar cell, in which a colored organic compound having photosensitization function is adsorbed to inorganic fine particles, proposed by Grätzel et al. (see Nature, 353, 737 (1991)), has the same configuration as the electrochromic device. However, as it stands, there is a problem of poor durability as with the electrochromic device.

BRIEF SUMMARY OF THE INVENTION

An object of the present invention is to provide an organic-inorganic composite material having excellent durability, in which a metal oxide and a functional organic material are strongly bound, a method for producing the organic-inorganic composite material, a functional electrode such as an electrode for electrochromic display device and electrode for photoelectric conversion device using the organic-inorganic composite material, and a functional device such as an electrochromic display device and photoelectric conversion device, which uses the functional electrode and has excellent initial color developing property and color developing stability over time.

To solve the aforementioned problems, the inventors of the present invention have diligently studied and found that the problems can be effectively solved by binding a metal oxide and a functional organic material via a silanol bond. In this case, the silanol bond is preferably formed by reacting a silane coupling agent with the metal oxide. Conventionally, the surface treatment of inorganic fine particles using an organic compound has been widely performed. For example, Japanese Patent Application Laid-Open (JP-A) No. 2004-191418 discloses an electronic device in which a metal oxide is treated with a silane coupling agent to improve its surface property. However, all examples that an organic compound is bound to inorganic fine particles via a silanol bond are aimed to improve surface properties of inorganic fine particles, but not to produce a functional electrode such as an electrode for electrochromic display device and an electrode for photoelectric conversion device, and a functional device such as an electrochromic display device and photoelectric conversion device, by binding a functional organic material to a metal oxide via a silanol bond. As the reason that the conventional adsorption property obtained by utilizing a hydrogen bond is degraded over time, it is considered that the adsorption force is not so strong that desorption of a functional organic material from a metal oxide occurs. On the other hand, the silanol bond in the organic-inorganic composite material of the present invention is so strong that desorption of a functional organic material from a metal oxide hardly occurs even over time. Thus, it is considered that the organic-inorganic composite material of the present invention is excellent in stability over time when it is used in a functional device such as an electrochromic display device or photoelectric conversion device. Moreover, because the functional organic material can be densely adsorbed on the metal oxide in the organic-inorganic composite material of the present invention, it is considered that initial color development density is improved by using the organic-inorganic composite material of the present invention in a functional device such as an electrochromic display device or photoelectric conversion device.

Note that the functional organic material of the present invention means an organic composition having at least any one of a photoelectric conversion function and chromic function and may form a complex with other organic compounds or inorganic compounds, and is of low molecular or high molecular.

The present invention is based on the findings by the inventors of the present invention, and means for solving the aforementioned problems are described below.

<1> An organic-inorganic composite material containing a metal oxide, and a functional organic material located on the metal oxide, wherein the functional organic material and the metal oxide are bound via a silanol bond.

<2> The organic-inorganic composite material according to <1>, wherein the silanol bond is formed by reacting a silane coupling agent with the metal oxide.

<3> The organic-inorganic composite material according to <2>, wherein the silane coupling agent has a reactive terminal.

<4> The organic-inorganic composite material according to <3>, wherein the reactive terminal has a structure selected from the following formulas:

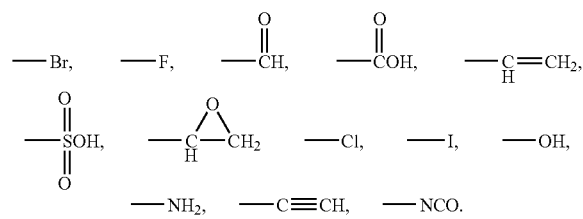

<5> The organic-inorganic composite material according to any one of <2> to <4>, wherein the silane coupling agent is a trichlorosilane compound.
<6> The organic-inorganic composite material according to any one of <2> to <4>, wherein the silane coupling agent is a trialkoxysilane compound.
<7> The organic-inorganic composite material according to any one of <2> to <4>, wherein the silane coupling agent is a monochlorosilane compound.
<8> The organic-inorganic composite material according to any one of <1> to <7>, wherein the functional organic material has electrochromic properties.
<9> The organic-inorganic composite material according to any one of <1> to <7>, wherein the functional organic material has photoelectric conversion function.
<10> A method for producing the organic-inorganic composite material according to any one of <1> to <9>, including reacting a silane coupling agent having a functional group reactive with a functional organic material with a metal oxide; and reacting the functional organic material with the functional group so as to bind the functional organic material and the metal oxide via a silanol bond.
<11> A display electrode for electrochromic display device containing an electrode and a color developing layer formed on the electrode, wherein the color developing layer contains the organic-inorganic composite material according to <8>.
<12> The display electrode for electrochromic display device according to <11>, wherein the electrode is a transparent electrode.
<13> An electrochromic display device containing the display electrode for electrochromic display device according to any one of <11> to <12>, a counter electrode arranged to face the display electrode for electrochromic display device at a distance, and an electrolyte layer between the display electrode and the counter electrode.
<14> The electrochromic display device according to <13>, further containing a white reflective layer which contains white titanium oxide fine particles.
<15> An electrode for photoelectric conversion device containing an electrode and a photoelectric conversion layer formed on the electrode, wherein the photoelectric conversion layer contains the organic-inorganic composite material according to <9>.
<16> A photoelectric conversion device containing the electrode for photoelectric conversion device according to <15>, a counter electrode arranged to face the electrode for photoelectric conversion device at a distance, and an electrolyte layer between the electrode for photoelectric conversion device and the counter electrode.

Figure 1:
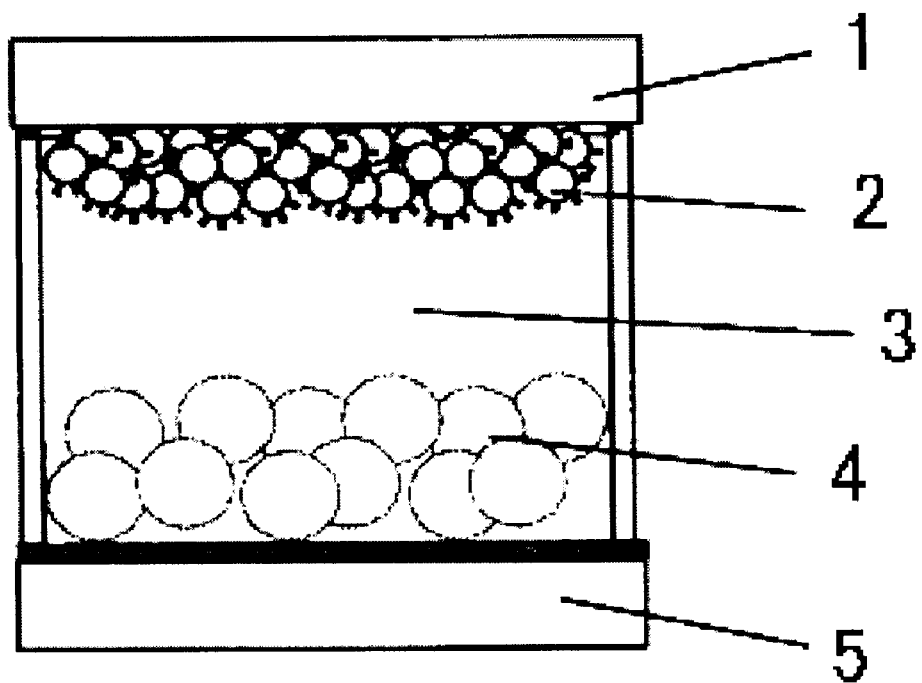
FIG. 1 shows an example of a configuration of an electrochromic display device of the present invention.

DETAILED DESCRIPTION OF THE INVENTION (Organic-Inorganic Composite Material)
The organic-inorganic composite material of the present invention contains a metal oxide and a functional organic material located on the metal oxide, wherein the functional organic material and the metal oxide are bound via a silanol bond. Thus, the functional organic material and the metal oxide are strongly bound via the silanol bond, so that the organic-inorganic composite material having excellent durability can be obtained.

-Silanol Bond-
The silanol bond is a bond represented by "—Si—O—", namely, a bond between a silicon atom and a metal oxide via an oxygen atom. The silanol bond is preferably formed by reacting a silane coupling agent with a metal oxide. Thus, a silanol bond can be easily formed by using a silane coupling agent.

In the organic-inorganic composite material of the present invention, the silane coupling agent itself may have functionality. However, when the silane coupling agent has a reactive terminal, the functional organic material can be bound via the reactive terminal. The silane coupling agent may have a plurality of reactive terminals.

The reactive terminal in the silane coupling agent may preferably have a structure selected from the following formulas.

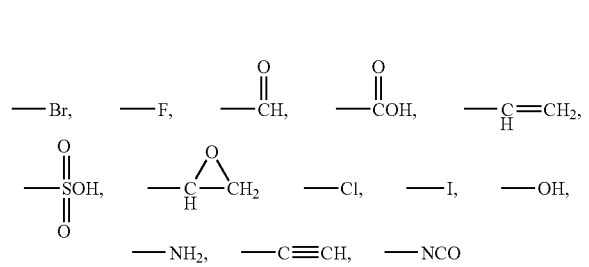

The silane coupling agent is not particularly limited and may be appropriately selected according to the purpose, as long as it has a reactive terminal as expressed above and can form a silanol bond. Trialkoxysilane compounds, trichlorosilane compounds and monochlorosilane compounds are particularly preferred in terms of easy synthesis. Trichlorosilane compounds are preferred because they are highly reactive and adsorbed on various metal oxides in a short time. Trialkoxysilane compounds are preferred in terms of easy control of reaction progress because they have relatively low reactivity. Mmonochlorosilane compounds are preferred in terms of easy control of the amount of adsorption to a metal oxide because they can prevent the silane coupling agent from oligomerization.

The silane coupling agent is not particularly limited and may be appropriately selected according to the purpose. Examples thereof include 1,2-dichloroethyltrichlorosilane, 1,2-dibromoethyltrichlorosilane, 10-undecenyldimethylchlorosilane, 11-bromoundecyldimethylchlorosilane, 11-bromoundecyltrichlorosilane, 11-bromoundecyltrimethoxysilane, 1-chloroethyltrichlorosilane, 2-(3,4-epoxycyclohexylethyl)trimethoxysilane, 2-(4-pyridylethyl)triethoxysilane, 2-aminoethylaminomethyltrimethoxysilane, 2-chloroethyltrichlorosilane, 2-cyanoethyltrichlorosilane, 3-(2,4-dinitrophenylamino)propyltriethoxysilane, 3-(trihydroxysilyl)-1-propanesulphonic acid, 3-aminopropyltriethoxysilane, 3-aminopropyltrimethoxysilane, 3-allylaminopropyltrimethoxysilane, 3-isocyanatepropyldimethylchlorosilane, 3-isocyanatepropyltriethoxysilane, 3-isocyanatepropyltrimethoxysilane, 3-chloropropyltriethoxysilane, 3-chloropropyltrichlorosilane, 3-cyanopropyltrichlorosilane, 3-bromopropyltriethoxysilane, 3-bromopropyltrichlorosilane, 3-mercaptopropyltrimethoxysilane, 3-mercaptopropylmethyldimethoxysilane, 4-(2-(trichlorosilyl)ethyl)pyridine, 4-chlorophenylchlorosilane, 4-chlorophenyltriethoxysilane, 4-chlorophenyltrimethoxysilane, 7-octenyltrichlorosilane, N-methylaminopropyltrimethoxysilane, allyltrichlorosilane, ureidepropyltriethoxysilane, chloromethyltriethoxysilane, chloromethyltrichlorosilane, chloromethyltrimethoxysilane, trimethoxyvinylsilane, vinyltrichlorosilane and mercaptomethyltrimethoxysilane. These may be used alone or in combination.

The silanol bond binding the functional organic material and the metal oxide is confirmed by detecting a silanol bond or the like in the functional organic material. For example, the silanol bond is detected by X-ray photoelectron spectroscopy or infrared spectroscopy. Specifically, a silanol bond or a functional organic material bound via a silanol bond can be confirmed by detecting a peak derived from silicon atoms, the functional organic material, silane coupling agent, or reactive terminal of the silane coupling agent by X-ray photoelectron spectroscopy. Alternatively, a silanol bond or a functional organic material bound via a silanol bond can be also confirmed by detecting a peak derived from the silanol bond (namely, a bond between silicon and a metal oxide), or a peak derived from the functional organic material, silane coupling agent or reactive terminal of the silane coupling agent by infrared spectroscopy.

-Metal Oxide-

The metal oxide is not particularly limited in its nature and form and may be appropriately selected according to the purpose, as long as it can form a silanol bond with a functional organic material. A metal oxide suitable for the property of functional organic material is suitably used.

The metal oxide is not particularly limited and may be appropriately selected according to the purpose. Examples thereof include titanium oxides, zinc oxides, tin oxides, alumina, zirconia, ceria, silica, yttria, boronia, magnesium oxides, strontium titanate, potassium titanate, barium titanate, calcium titanate, calcia, ferrite, hafnia, tungsten trioxides, iron oxides, copper oxides, nickel oxides, cobalt oxides, barium oxides, strontium oxides, vanadium oxides, indium oxides, barium titanate, aluminosilica, calcium phosphate and aluminosilicate. These may be used alone or in combination. Of these, titanium oxides, zinc oxides, tin oxides, alumina, zirconia, iron oxides, magnesium oxides, indium oxides and tungsten trioxides are preferable. Titanium oxides are most preferable in terms of electrical and physical properties.

The average primary particle diameter of the metal oxide is not particularly limited and may be appropriately selected according to the purpose. It is preferably 200 nm or less, and more preferably 30 nm or less.

When the metal oxide has an average primary particle diameter of 200 nm or less, the specific surface area of the metal oxide becomes large enough to be able to adsorb and bind more chromophores, and the metal oxide much excels in color developing property. When the metal oxide has an average primary particle diameter of 30 nm or less, light transmission through the metal oxide significantly increases, and the metal oxide much excels in color developing property.

-Functional Organic Material-

The functional organic material preferably has any one of electrochromic properties and photoelectric conversion function. Thus, the functional organic material can be used for various applications such as in electrochromic display devices and photoelectric conversion devices.

As the functional organic material having electrochromic properties, a material which has a chromophore which may change its color tone by electricity and directly and/or indirectly forms a silanol bond with a metal oxide may be used. The compound having a chromophore is not particularly limited and may be appropriately selected according to the purpose. Examples thereof include azobenzene compounds, anthraquinone compounds, diarylethene compounds, dihydroprene compounds, spirooxazine compounds, spirothiopyran compounds, spiropyran compounds, thioindigo compounds, tetrathiafulvalene compounds, triphenylmethane compounds, triphenylamine compounds, naphthopyran compounds, viologen compounds, pyrazoline compounds, phenazine compounds, phenylenediamine compounds, phenoxazine compounds, phenothiazine compounds, phthalocyanine compounds, fluorane compounds, fulgide compounds, benzopyrane compound and metallocene compounds. Of these, viologen compounds are particularly preferred in terms of excellent durability.

Examples of viologen compounds include 1-ethyl-4-(4-pyridyl)pyridinium chloride, 1-hexyl-4-(4-pyridyl)pyridinium bromide, 1-cyanophenyl-4-(4-pyridyl)pyridinium chloride, 1-ethyl-1'-carboxy-4,4'-bipyridinium dichloride, 1-methyl-1'-carboxyethyl-4,4'-bipyridinium dichloride, 1,1'-bis(carboxymethyl)-4,4'-bipyridinium dichloride, β-(10-phenothiazinyl)propionate, β-(10-phenothiazinyl)ethylphosphonate, β-(10-phenothiazinyl)methylslufonate, hydroxyanthraquinone-1-sulfonate, hydroxyanthraquinone-2-sulfonate, triphenylpyrazoline, styrylpyrazoline and lanthanide-diphthalocyanine.

The functional organic material having photoelectric conversion function is not particularly limited and may be appropriately selected according to the purpose, as long as it has absorption in at least one of the visible light band and infrared light band, and can directly or indirectly form a silanol bond with a metal oxide. Examples thereof include organic dyes such as coumarin compounds, azo compounds, cyanine compounds, spiropyran compounds, xanthene compounds; metal complex dyes such as ruthenium complexes, and quaternary salt compounds thereof, porphyrin compounds, phthalocyanine compounds, and mixtures thereof.

Specific examples thereof include cyanidin 3-glucosidetetrasulfonated gallium phthalicyanine, cis-di(thiocyanato)-bis(2,2'-bipyridyl-4,4'-dicarboxylic acid)-ruthenium (II), cis-di(thiocyanato)-(2,2'-bipyridyl-4,4'-dicarboxylic acid) (4,4'-ditridecyl-2,2'-bipyridyl)-ruthenium(II), cis-di(thiocyanato)-bis(2,2'-bipyridyl-4-carboxylate-4'-carboxylic acid)-ruthenium(II), cis-di(thiocyanato)-(2,2'-bipyridyl-4,4'-dicarboxylic acid) (4-methyl-4'-hexadecyl-2,2'-bipyridyl)-ruthenium(II), 3-hydroxycarbonylcoumarin, 7-hydroxycarbonylcoumarin, 8-hydroxycarbonylcoumarin, Zn 5,10,15,20-tetracarboxyphenylporphyrin, and tetrasulfonated zinc porphyrin.

(Method for Producing Organic-inorganic Composite Material)

A method for producing an organic-inorganic composite material of the present invention is as follows: a silane coupling agent having a functional group reactive with a functional organic material is reacted with a metal oxide, and then a functional organic material is reacted with the functional group so as to bind the functional organic material and the metal oxide via a silanol bond to produce the organic-inorganic composite material.

Here, a method for producing an organic-inorganic composite material is specifically exemplified as follows: a dispersion of titanium oxide fine particles as a metal oxide is applied onto a glass substrate by spin coating using a mask, the glass substrate having a transparent electrode film made of tin oxide on the entire surface, to deposit a titanium oxide layer. Next, the electrode having the titanium oxide layer is immersed in 5 mass % 3-bromopropyltriethoxysilane toluene solution, after addition of triethylamine, and left to stand for 24 hours, and then washed and dried. The obtained electrode is immersed in 5 mass % aqueous 1-ethyl-4-(4-pyridyl)pyridinium chloride solution at 80° C. for 100 hours, and then washed and dried to obtain an organic-inorganic 10 composite material, in which 1-ethyl-4-(4-pyridyl)pyridinium chloride as a functional organic material and a titanium oxide are bound via a silanol bond.

The method for producing an organic-inorganic composite material of the present invention can easily produce an organic-inorganic composite material, in which the functional organic material and the metal oxide are strongly bound via a silanol bond, and the functional organic material can be easily and strongly attached on an inorganic material even though the functional organic material has a structure which was hard to be attached thereon, and can provide a novel functional material having an excellent function.

(Display Electrode for Electrochromic Display Device and Electrochromic Display Device)

A display electrode for electrochromic display device of the present invention contains an electrode and a color developing layer on the electrode, wherein the color developing layer contains the organic-inorganic composite material of the present invention having electrochromic properties. Adoption of such a configuration enables electrons to move easily between electrodes, thus the display electrode for electrochromic display device is excellent in response and durability.

The electrode contains a substrate for display electrode, electrode for display electrode and color developing layer, and the substrate for display electrode may function as the electrode for display electrode.

Examples of materials for the substrate include glass; and plastics such as acrylic resins, polycarbonate resins and epoxy resins.

The materials for the electrode are not particularly limited and may be appropriately selected according to the purpose, as long as they have electrical conductivity. Examples thereof include ITO and FTO (for transparent electrodes); and metals such as copper, zinc, gold, platinum, iron and aluminium. Of these, ITO and FTO (for transparent electrodes) are particularly preferred in terms of visibility from an electrode side in the electrochromic display device.

The electrochromic display device of the present invention contains a display electrode for electrochromic display device of the present invention, a counter electrode arranged to face the display electrode for electrochromic display device at a distance, an electrolyte layer arranged between the display electrode and counter electrode, and further contains other components as necessary.

The counter electrode has a substrate and electrode, and the substrate may function as the electrode.

The electrolyte layer is arranged between the display electrode and the counter electrode. The electrolyte is not particularly limited and may be appropriately selected from known nonaqueous electrolytes and aqueous electrolytes according to the purpose. Examples thereof include organic electrolytic solutions, polymer solid electrolytes, gel electrolytes and ionic liquids.

In the electrochromic display device, a white reflective layer containing white titanium oxide fine particles is preferably provided. By providing the white reflective layer, the visibility of the electrochromic display device of the present invention is improved.

Here, FIG. 1 shows an example of a configuration of an electrochromic display device of the present invention. However, the configuration of the electrochromic display device of the present invention is not limited to FIG. 1.

In FIGS. 1, 1, 2, 3, 4 and 5 respectively denote a display electrode, a color developing layer containing an organic-inorganic composite material having electrochromic properties of the present invention, an electrolyte, a white reflective layer and a counter electrode.

(Electrode for Photoelectric Conversion Device and Photoelectric Conversion Device)

An electrode for photoelectric conversion device of the present invention contains an electrode, and a photoelectric conversion layer formed on the electrode, wherein the photoelectric conversion layer contains the organic-inorganic composite material of the present invention. Adoption of such a configuration enables electrons to move easily between electrodes, thus the electrode for photoelectric conversion device is excellent in light conversion efficiency and durability.

The electrode has a substrate for photoelectric conversion, electrode for photoelectric conversion and photoelectric conversion layer, and the substrate for photoelectric conversion may function as the electrode for photoelectric conversion.

Examples of materials for the substrate include glass; and plastics such as acrylic resins, polycarbonate resins and epoxy resins.

The material for the electrode is not particularly limited and may be appropriately selected according to the purpose, as long as it has electrical conductivity. Examples thereof include ITO and FTO (for transparent electrodes); and metals such as copper, zinc, gold, platinum, iron and aluminium. Of these, ITO and FTO (for transparent electrodes) are particularly preferred because they enable to receive light from the electrode side in the photoelectric conversion device.

The photoelectric conversion device of the present invention contains an electrode for photoelectric conversion device of the present invention, a counter electrode arranged to face the electrode for photoelectric conversion device at a distance, and an electrolyte layer arranged between the electrode and counter electrode, and further contains other components as necessary.

The counter electrode has a substrate and an electrode, and the substrate may function as the electrode.

The electrolyte layer is arranged between the electrode for photoelectric conversion device and the counter electrode. An electrolyte is not particularly limited and may be appropriately selected from known nonaqueous electrolytes and aqueous electrolytes according to the purpose. Examples thereof

EXAMPLES

Hereinafter, Examples of the present invention will be described, which however shall not be construed as limiting the scope of the present invention. All percentages and parts are by mass unless indicated otherwise.

Example 1

-Preparation of Display Electrode-

A dispersion of titanium oxide fine particles (TKS-203 manufactured by Tayca Co., Ltd, average primary particle diameter: 6 nm) was applied onto a portion (area: 1 cm$^2$) of a glass substrate by spin coating using a mask, the glass substrate having a transparent electrode film made of tin oxide on the entire surface, and heated at 450° C. for 1 hour to deposit a titanium oxide layer having a thickness of 2 μm.

Next, the electrode having the titanium oxide layer was immersed in 100 ml of 5% 3-bromopropyltriethoxysilane toluene solution, and 5 g of triethylamine was added therein, left to stand for 24 hours, and then washed and dried. The obtained electrode was immersed in 5% aqueous 1-ethyl-4-(4-pyridyl)pyridinium chloride solution at 80° C. for 100 hours, and then washed and dried to prepare a display electrode.

—Preparation of Counter Electrode—

In 10 ml of tetrahydrofuran solution, 5 g of titanium oxide particles having a primary particle diameter of 300 nm (CR-50 manufactured by ISHIHARA SANGYO KAISHA, LTD.) and 1 g of a polyester resin (FINEDIC M-8076 manufactured by DIC Corporation) in 50% methyl ethyl ketone (MEK) solution were dispersed to prepare a dispersion.

The obtained dispersion was applied over an entire surface of a zinc plate having a thickness of 0.2 mm using a wire bar, and dried to prepare a counter electrode. The obtained counter electrode had a thickness of 5 μm, and exhibited a white color similar to paper.

-Production of Electrochromic Display Device-

The display electrode and the counter electrode were bonded together with spacers of 50 μm in thickness interposed between them to prepare a cell. Subsequently, an electrolyte solution was prepared by dissolving lithium perchlorate in propylene carbonate to a concentration of 0.2M, and sealed in the cell to produce an electrochromic display device.

Example 2

An electrochromic display device was produced in the same manner as in Example 1, except that 1-ethyl-4-(4-pyridyl)pyridinium chloride in Example 1 was changed to 1-hexyl-4-(4-pyridyl)pyridinium bromide.

Example 3

An electrochromic display device was produced in the same manner as in Example 1, except that a display electrode prepared as described below was used.

-Preparation of Display Electrode-

A dispersion of titanium oxide fine particles (TKS-203 manufactured by Tayca Co., Ltd, average primary particle diameter: 6 nm) was applied onto a portion (area: 1 cm$^2$) of a glass substrate by spin coating using a mask, the glass substrate having a transparent electrode film made of tin oxide on the entire surface, and heated at 450° C. for 1 hour to deposit a titanium oxide layer having a thickness of 2 μm.

Next, the electrode having the titanium oxide layer was immersed in 0.2% 3-bromopropyl trichlorosilane toluene solution for 2 hours, and then washed and dried. The obtained electrode was immersed in 5% aqueous 1-ethyl-4-(4-pyridyl)pyridinium chloride solution at 80° C. for 100 hours, and then washed and dried to prepare a display electrode.

Example 4

-Preparation of Display Electrode-

A dispersion of titanium oxide fine particles (TKS-203 manufactured by Tayca Co., Ltd, average primary particle diameter: 6 nm) was applied onto a portion (area: 1 cm$^2$) of a glass substrate by spin coating using a mask, the glass substrate having a transparent electrode film made of tin oxide on the entire surface, and heated at 450° C. for 1 hour to deposit a titanium oxide layer having a thickness of 2 μm.

Next, the electrode having the titanium oxide layer was immersed in 0.2% 3-bromopropyltrichlorosilane toluene solution for 1 hour, and then washed and dried. The obtained electrode was immersed in 5% 4-4'-bipyridyl toluene solution at 80° C. for 10 hours, and then washed and dried. Next, the electrode was immersed in 10% 2-bromoethane toluene solution at 80° C. for 10 hours, and then washed and dried to prepare a display electrode.

-Preparation of Counter Electrode-

A counter electrode was prepared in the same manner as in Example 1.

-Production of Electrochromic Display Device-

The display electrode and the counter electrode were bonded together with spacers of 50 μm in thickness interposed between them to prepare a cell. Subsequently, an electrolyte solution was prepared by dissolving lithium perchlorate in acetonitrile to a concentration of 0.2M, and sealed in the cell to produce an electrochromic display device.

Example 5

An electrochromic display device was produced in the same manner as in Example 4, except that 3-bromopropyltrichlorosilane in Example 4 was changed to 11-bromoundecyltrichlorosilane.

Example 6

A dispersion of titanium oxide fine particles (TKS-203 manufactured by Tayca Co., Ltd, average primary particle diameter: 6 nm) was applied onto a portion (area: 1 cm$^2$) of a glass substrate by spin coating using a mask, the glass substrate having a transparent electrode film made of tin oxide on the entire surface, and heated at 450° C. for 1 hour to deposit a titanium oxide layer having a thickness of 2 μm.

Next, the electrode having the titanium oxide layer was immersed in 5% tris(p-trichlorosilylpropylphenyl)amine alcohol solution for 48 hours, and then washed and dried to prepare a display electrode. Note that tris(p-trichlorosilylpropylphenyl)amine is an electrochromic dye which binds to a metal oxide by silane bonding and has chromic function.

Next, an electrochromic display device was produced by preparing a counter electrode and electrolytic solution in the same manner as in Example 1.

Example 7

An electrochromic display device was produced in the same manner as in Example 4, except that 3-bromopropyl-trichlorosilane in Example 4 was changed to 11-bromoundecyldimethylchlorosilane.

Comparative Example 1

An electrochromic display device was produced in the same manner as in Example 1, except that a display electrode prepared as described below was used.

-Preparation of Display Electrode-

A compound expressed by the following formula as an organic electrochromic compound was dissolved in water to prepare a 0.02M solution of the organic electrochromic compound.

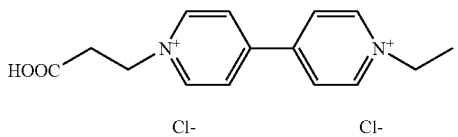

A dispersion of titanium oxide fine particles (TKS-203 manufactured by Tayca Co., Ltd., average primary particle diameter: 6 nm) was applied onto a portion (area: 1 cm$^2$) of a glass substrate by spin coating using a mask, the glass substrate having a transparent electrode film made of tin oxide on the entire surface, and heated at 450° C. for 1 hour to deposit a titanium oxide layer having a thickness of 2 μm.

Next, the electrode having the titanium oxide layer was immersed in a solution of organic electrochromic compound expressed by the above formula for 24 hours, and then washed and dried to prepare a display electrode.

Comparative Example 2

An electrochromic display device was produced in the same manner as in Example 1, except that a display electrode prepared as described below was used.

-Preparation of Display Electrode-

A compound expressed by the following formula as the organic electrochromic compound was dissolved in water to prepare a 0.02M solution of the organic electrochromic compound.

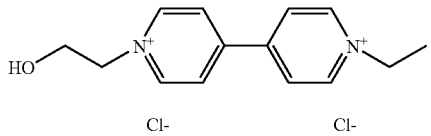

A dispersion of titanium oxide fine particles (TKS-203 manufactured by Tayca Co., Ltd., average primary particle diameter: 6 nm) was applied onto a portion (area: 1 cm$^2$) of a glass substrate by spin coating using a mask, the glass substrate having a transparent electrode film made of tin oxide on the entire surface, and heated at 450° C. for 1 hour to deposit a titanium oxide layer having a thickness of 2 μm.

Next, the electrode having the titanium oxide layer was immersed in a solution of the organic electrochromic compound expressed by the above formula for 24 hours, and then washed and dried to prepare a display electrode.

Comparative Example 3

An electrochromic display device was produced in the same manner as in Comparative Example 1, except that the organic electrochromic compound in Comparative Example 1 was change to a compound expressed by the following formula.

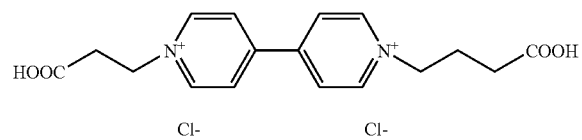

Next, the color developing and erasing properties and durability (color developing property over time) of the obtained electrochromic display devices were evaluated as follows. The results are shown in Table 1.

<Color Developing and Erasing Test (Initial Color Developing Property)>

The color developing and erasing properties of each electrochromic display device was evaluated by measuring reflectance by irradiating with diffusion light using a spectrocolorimeter (LCD-5000 manufactured by Otsuka Electronics Co., Ltd.). The results are shown in Table 1. The reflectance in Table 1 is a value obtained by dividing a reflected light of each of the prepared electrochromic display device by a reference output and expressed in percentage (%). The reference output was a reflected light occurring when a standard white plate was irradiated with light at an incident angle of 30 degrees. Note that when the color developing property was good, the reflectance was decreased, and when color developing property was degraded, the reflectance was increased. A voltage was applied using a function generator FG-02 (manufactured by Toho Technical Research Co., Ltd.).

When the reflectance was measured without applying voltage, each electrochromic display device showed a high value of about 60%. The reflectance was measured by irradiating a diffusion light using a spectrocolorimeter (LCD-5000 manufactured by Otsuka Electronics Co., Ltd.).

When the display electrode was connected to a negative electrode and the counter electrode was connected to a positive electrode (or the display electrode was connected to a positive electrode and the counter electrode was connected to a negative electrode), and a voltage of 2.5V was applied thereto, blue color was developed. When a voltage of −1.0V was sufficiently applied to the display electrode, the blue color was erased and white color appeared again. The color developing property was evaluated on the following evaluation criteria.

A: Blue color developed only in a part of the titanium oxide layer in the display electrode.

B: Blue color developed in a part of the titanium oxide layer and parts in the display electrode.

C: Color development was hardly observed.

<Durability Test (Color Developing Property Over Time)>

After each electrochromic display device was left to stand for 1 week, the color developing and erasing test was performed again and each white reflective layer was observed. By measuring reflectance, the color developing property over time was evaluated, thereby obtaining a result of the durability test.

TABLE 1

|  | Initial | | After left for 1 week | |
|---|---|---|---|---|
|  | Color developing property | reflectance (*1) | Color developing property | reflectance (*1) |
| Example 1 | A | 11% | A | 12% |
| Example 2 | A | 12% | A | 12% |
| Example 3 | A | 9% | A | 10% |
| Example 4 | A | 10% | A | 10% |
| Example 5 | A | 11% | A | 11% |
| Example 6 | A | 15% | A | 15% |
| Example 7 | A | 13% | A | 13% |
| Comparative Example 1 | B | 20% | C | 35% |
| Comparative Example 2 | C | 24% | C | 40% |
| Comparative Example 3 | B | 15% | C | 34% |

(*1): the reflectance in a part of the titanium oxide layer in the display electrode upon color development Example 8

-Preparation of Photoelectric Conversion Electrode-

In a vessel, 2 g of titanium oxide (P-25 manufactured by NIPPON AEROSIL CO., LTD.), 6.0 g of water, 0.2 ml of acetylacetone and 0.1 g of a surfactant (Triton-X100 manufactured by Sigma-Aldrich Co. United States) were loaded and dispersed for 2 hours by a paint shaker. Next, 1.0 g of 20% polyethylene glycol (manufactured by Wako Pure Chemical Industries, Ltd., mass average molecular weight: 20,000) was added therein to prepare a titanium oxide paste.

The titanium oxide paste was uniformly applied onto a portion (area: 1 cm$^2$) of a glass substrate by spin coating using a mask, the glass substrate having a transparent electrode film made of tin oxide on the entire surface, and naturally dried and then baked at 450° C. for 1 hour to deposit a titanium oxide film having a thickness of 10 μm.

Next, the electrode was immersed in 200 ml of 5% 3-aminopropyltriethoxysilane toluene solution, and 2 g of triethylamine was added therein, refluxed for 8 hours and then washed and dried.

Next, the electrode was placed in a container, 5.7 g of Coumarin 343, 2.5 g of N,N'-diisopropylcarbodiimide, 2.7 g of N,N'-diisopropylcarbodiimide, and 200 g of tetrahydrofuran (THF) were added therein, refluxed for 2 hours and then washed and dried to prepare a photoelectric conversion electrode.

-Preparation of Counter Electrode-

A platinum film was deposited by vacuum evaporation onto a glass substrate having a transparent electrode film made of tin oxide on the entire surface so as to have a thickness of 20 nm to prepare a counter electrode.

-Production of Photoelectric Conversion Device-

The photoelectric conversion electrode and the counter electrode were disposed via insulating spacers of 10 μm in thickness interposed between them, an oxidation-reduction electrolyte solution prepared by adding iodine and tetrapropylammonium iodide in a mixed solvent of ethylene carbonate and acetonitrile, was poured therein, and then sealed with an epoxy adhesive to produce a photoelectric conversion device.

The obtained photoelectric conversion device had a photoelectric conversion efficiency of 2.5% under irradiation with pseudo sunlight (AM1.5, 100 mW/cm$^2$). Moreover, after the photoelectric conversion device was left to stand for 1 week at room temperature, it had a photoelectric conversion efficiency of 2.5% under irradiation with the pseudo sunlight.

Comparative Example 4

-Preparation of Photoelectric Conversion Electrode-

In a vessel, 2 g of titanium oxide (P-25 manufactured by NIPPON AEROSIL CO., LTD.), 6.0 g of water, 0.2 ml of acetylacetone and 0.1 g of a surfactant (Triton-X100 manufactured by Sigma-Aldrich Co. United States) were loaded and dispersed for 2 hours by a paint shaker. Next, 1.0 g of 20% polyethylene glycol (manufactured by Wako Pure Chemical Industries, Ltd., mass average molecular mass: 20,000) was added therein to prepare a titanium oxide paste.

The titanium oxide paste was uniformly applied onto a portion (area: 1 cm$^2$) of a glass substrate by spin coating using a mask, the glass substrate having a transparent electrode film made of tin oxide on the entire surface, and naturally dried and then baked at 450° C. for 1 hour to deposit a titanium oxide film having a thickness of 10 μm.

Next, the electrode was immersed in a 2% ethanol solution of Coumarin 343, refluxed for 2 hours and then washed and dried to prepare a photoelectric conversion electrode.

-Preparation of Counter Electrode-

A counter electrode was prepared in the same manner as in Example 8.

-Production of Photoelectric Conversion Device-

A photoelectric conversion device was produced in the same manner as in Example 8.

The obtained photoelectric conversion device had a photoelectric conversion efficiency of 2.0% under irradiation with pseudo sunlight (AM1.5, 100 mW/cm$^2$). Moreover, after the photoelectric conversion device was left to stand for 1 week at room temperature, it had a photoelectric conversion efficiency of 0.5% under irradiation with the pseudo sunlight.

An electrochromic display device using the organic-inorganic composite material of the present invention is excellent in response and durability, and can be suitably used for, for example, electronic paper, electronic albums and various display devices.

The photoelectric conversion device using the organic-inorganic composite material of the present invention is excellent in light conversion efficiency and durability, and can be suitably used for, for example, dye-sensitized solar batteries.

What is claimed is:

1. An organic-inorganic composite material comprising:
a metal oxide; and
a functional organic material located on the metal oxide,
wherein the functional organic material and the metal oxide are bound via a silanol bond formed by reacting a trichlorosilane with the metal oxide.

2. The organic-inorganic composite material according to claim 1, wherein the trichlorosilane has a reactive terminal.

3. The organic-inorganic composite material according to claim 2, wherein the reactive terminal has a structure selected from the following formulas:

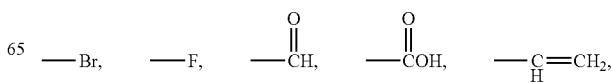

-continued

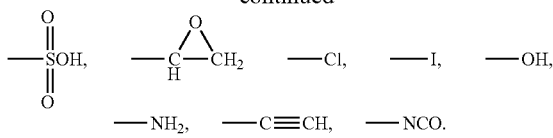

4. The organic-inorganic composite material according to claim 1, wherein the functional organic material has electrochromic properties.

5. The organic-inorganic composite material according to claim 1, wherein the functional organic material has photoelectric conversion function.

6. The organic-inorganic composite material according to claim 1, wherein the metal oxide is in the form of particles and the functional organic material is covalently bound to the surface of the particles of the metal oxide via the silanol bond.

7. The organic-inorganic composite material according to claim 6, wherein the metal oxide is titanium oxide in the form of particles and the functional organic material is a chlorosilane.

8. A display electrode having a surface on which the organic-inorganic composite of claim 6 is present.

9. The electrode of claim 8, wherein the particles of the metal oxide are present on the surface of a glass substrate having a tin oxide thin film surface.

10. The organic-inorganic composite material according to claim 1, wherein the trichlorosilane is 3-bromopropyltrichlorosilane and the metal oxide is titanium oxide.

11. An electrochromic display device comprising a display electrode for electrochromic display device, a counter electrode arranged to face the display electrode for electrochromic display device at a distance, and an electrolyte layer between the display electrode and the counter electrode,
wherein the display electrode for electrochromic display device comprises an electrode and a color developing layer formed on the electrode, and the color developing layer comprises an organic-inorganic composite material which comprises:
a metal oxide; and
a functional organic material located on the metal oxide,
wherein the functional organic material and the metal oxide are bound via a silanol bond.

12. The electrochromic display device according to claim 11, further comprising a white reflective layer which comprises white titanium oxide fine particles.

13. The electrochromic display device according to claim 11, wherein the metal oxide is in the form particles of titanium oxide, the particles of titanium oxide are present on the face of the display electrode and the functional organic material is bound to the surface of the metal particles via a silanol bond.

14. A photoelectric conversion device comprising an electrode for photoelectric conversion device, a counter electrode arranged to face the electrode for photoelectric conversion device at a distance, and an electrolyte layer between the electrode for photoelectric conversion device and the counter electrode,
wherein the electrode for photoelectric conversion device comprises an electrode and a photoelectric conversion layer formed on the electrode, and the photoelectric conversion layer comprises an organic-inorganic composite material which comprises:
a metal oxide; and
a functional organic material located on the metal oxide,
wherein the functional organic material and the metal oxide are bound via a silanol bond.

15. The photoelectric conversion device of claim 14, having a photoelectric conversion efficiency on radiation with pseudo sunlight of 2.5% or more.

16. An electrochromic display device, comprising:
a display electrode having a surface on which an organic-inorganic composite is present,
wherein the organic-inorganic composite material comprises:
a metal oxide in the form of particles; and
a functional organic material located on the metal oxide and covalently bound to the surface of the particles of the metal oxide via a silanol bond;
a counter electrode;
one or more spacers between the electrode and the counter electrode wherein the spacers form voids between the display electrode and the counter electrode; and
an electrolyte solution present in the voids between the display electrode and the counter electrode.

* * * * *

UNITED STATES PATENT AND TRADEMARK OFFICE
CERTIFICATE OF CORRECTION

| | | |
|---|---|---|
| PATENT NO. | : 7,830,584 B2 | Page 1 of 1 |
| APPLICATION NO. | : 12/204520 | |
| DATED | : November 9, 2010 | |
| INVENTOR(S) | : Takeshi Shibuya et al. | |

It is certified that error appears in the above-identified patent and that said Letters Patent is hereby corrected as shown below:

On the title page, Item (63), the Related U.S. Application Data information is incorrect. Item (63) should read:

-- Related U.S. Application Data

(63) Continuation of application No. PCT/JP2006/326241, filed on Dec. 28, 2006. --

Signed and Sealed this
Fifteenth Day of March, 2011

David J. Kappos
*Director of the United States Patent and Trademark Office*